(12) United States Patent
Shimizu et al.

(10) Patent No.: US 8,861,323 B2
(45) Date of Patent: Oct. 14, 2014

(54) OPTICAL DISK RECORDING DEVICE AND OPTICAL DISK RECORDING METHOD

(71) Applicant: Funai Electric Co., Ltd., Osaka (JP)

(72) Inventors: Shinya Shimizu, Osaka (JP); Hiroshi Mitsuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/863,681

(22) Filed: Apr. 16, 2013

(65) Prior Publication Data

US 2013/0286809 A1 Oct. 31, 2013

(30) Foreign Application Priority Data

| Apr. 25, 2012 | (JP) | 2012-099846 |
| Apr. 25, 2012 | (JP) | 2012-099847 |
| Feb. 12, 2013 | (JP) | 2013-024184 |

(51) Int. Cl.
| G11B 7/0045 | (2006.01) |
| G11B 27/36 | (2006.01) |
| G11B 7/1267 | (2012.01) |
| G11B 20/10 | (2006.01) |
| G11B 20/12 | (2006.01) |

(52) U.S. Cl.
CPC ........ *G11B 27/36* (2013.01); *G11B 2220/2537* (2013.01); *G11B 7/1267* (2013.01); *G11B 20/10481* (2013.01); *G11B 2020/1275* (2013.01)
USPC .................. 369/47.51; 369/53.12; 369/53.26; 369/116

(58) Field of Classification Search
USPC ............ 369/53.31, 47.5, 47.51, 47.52, 47.53, 369/53.11, 53.12, 53.14, 53.23, 53.28, 369/53.26, 116
See application file for complete search history.

(56) References Cited

U.S. PATENT DOCUMENTS

| 6,356,515 B1 * | 3/2002 | Kumita et al. | 369/13.26 |
| 6,721,254 B1 * | 4/2004 | Yamaguchi | 369/53.35 |

(Continued)

FOREIGN PATENT DOCUMENTS

| JP | 2003-346338 A | 12/2003 |
| JP | 2004-319024 A | 11/2004 |
| JP | 2007-080404 A | 3/2007 |

(Continued)

*Primary Examiner* — Thomas Alunkal
(74) *Attorney, Agent, or Firm* — Morgan, Lewis & Bockius LLP

(57) ABSTRACT

The present invention optimizes recording power based on correct β value. Whether an average of modulation values between the 2-4th AUNs is equal to or less than 65% of an average of modulation values between the 5-7th AUNs or not is judged. Otherwise, the gradual emission is performed, the β value is measured, and then the following requirement is judged:

(average of β values between 5-7th AUNs)−(average of β values between 2-4th AUNs)≥0.18

If each requirement is satisfied, track shift is judged to occur. The recording area of high output is compared with the recording area of lower output to judge whether or not magnitude relation matches the correct magnitude relation. Also, whether the difference between the β value of high output and the β value of lower output is equal to or more than the predetermined value (0.18) or not is judged.

16 Claims, 12 Drawing Sheets

(56) References Cited

U.S. PATENT DOCUMENTS

| | | | |
|---|---|---|---|
| 2002/0186634 A1* | 12/2002 | Shiozawa et al. | 369/47.52 |
| 2004/0120234 A1* | 6/2004 | Sano | 369/47.53 |
| 2005/0088940 A1* | 4/2005 | Toda et al. | 369/53.27 |
| 2006/0291352 A1* | 12/2006 | Murakami et al. | 369/47.53 |
| 2007/0121457 A1* | 5/2007 | Yamada et al. | 369/53.32 |
| 2008/0031107 A1* | 2/2008 | Hoshi et al. | 369/47.5 |
| 2008/0101177 A1* | 5/2008 | Sehara | 369/47.5 |
| 2008/0212425 A1* | 9/2008 | Yukihiro et al. | 369/47.51 |
| 2009/0135696 A1* | 5/2009 | Wada | 369/53.31 |

FOREIGN PATENT DOCUMENTS

| | | |
|---|---|---|
| JP | 2007-133958 A | 5/2007 |
| JP | 2008-041128 A | 2/2008 |
| JP | 2008-041139 A | 2/2008 |
| JP | 2008-108340 A | 5/2008 |
| JP | 2009-129516 A | 6/2009 |
| JP | 2010-165386 A | 7/2010 |

* cited by examiner

DVD-RW

OPTICAL DISK RECORDING DEVICE AND OPTICAL DISK RECORDING METHOD

CROSS-REFERENCES TO RELATED APPLICATIONS

The present invention contains subject matter related to and claims the benefit of Japanese Patent Application No. 2012-099846, filed in the Japan Patent Office on Apr. 25, 2012, Japanese Patent Application No. 2012-099847, filed in the Japan Patent Office on Apr. 25, 2012, and Japanese Patent Application No. 2013-024184, filed in the Japan Patent Office on Feb. 12, 2013 the entire contents of which being incorporated herein by reference.

BACKGROUND OF THE INVENTION

1. Field of the Invention

The present invention is related to an optical disk recording device and an optical disk recording method to perform an OPC (Optimum Power Calibration) before recording a signal on an optical disk.

2. Description of the Related Art

In recent years, optical recording disks on the market are manufactured based on a predetermined format, but detailed specifications are different depending on the manufacturer. Therefore, an optimal recording power is different from each other. In order to solve the problem, in the optical disk recording device to record a signal on the optical disk, an OPC (Optimum Power Calibration) is performed to determine an optimal value (target value) of the recording power before recording a signal such as an image. The OPC is a process to record a signal on a PCA (Power Calibration Area), which is formed inner periphery of the optical disk, gradually changing the recording power and regenerate the recorded signal in order to determine the optimal value of the recording power.

Conventionally, the following documents are known as optical disk recording devices and optical disk recording methods to perform the OPC (Optimum Power Calibration) before recording the signal on the optical disk.

[Patent document 1] Japanese Patent Application Publication 2010-165386
[Patent document 2] Japanese Patent Application Publication 2009-129516
[Patent document 3] Japanese Patent Application Publication 2008-041128
[Patent document 4] Japanese Patent Application Publication 2007-133958
[Patent document 5] Japanese Patent Application Publication 2007-080404
[Patent document 6] Japanese Patent Application Publication 2008-108340
[Patent document 7] Japanese Patent Application Publication 2008-041139
[Patent document 8] Japanese Patent Application Publication 2004-319024
[Patent document 9] Japanese Patent Application Publication 2003-346338

The patent document 1 discloses an optical disk device and its control method. It provides the optical disk device and its control method capable of eliminating the need of correcting a reading value of a signal for every optical disk device when manufacturing the optical disk device. The paragraph [0066] discloses that "the adjusting target value of the luminescence control circuit 4 is determined by correcting the $\beta$ value obtained when recording the data on the optical disk 1 or when regenerating the data recorded in the optical disk 1 by using the correction value $\beta x$ so that the corrected $\beta$ value becomes the target $\beta$ value".

The patent document 2 discloses an optical disk device and an evaluation method of recording quality of a data. It suggests the optical desk device and a method of selecting an OPC, with which accuracy of OPC during data recording to an unknown medium can be ensured. The paragraph [0050] discloses that "a predetermined number of $\beta$ values around the $\beta$ value B1, as a center, corresponding to the recommended recording power (e.g. five $\beta$ values before and after the $\beta$ value B1) are measured, and it is determined that both of them are linearly approximated if a distance among the measured $\beta$ values is equal to or larger than a predetermined percentage (e.g. 15%) and the number of $\beta$ values existing in such a predetermined percentage is equal to or larger than a predetermined number (e.g. eight $\beta$ values)".

The patent document 3 discloses an optical disk device and a method of correcting a recording power. It provides a method for correcting the recording power in real time, and to provide an optical disk device achieving high-speed recording and high quality by employing the method. The paragraphs [0031] to [0032] disclose that "the obtained $\beta$ value is conducted so-called averaging process,—the obtained $\beta$ value is compared with the target value (Target $\beta$)±the permissible value. As a result, when the $\beta$ value is larger than the target value (Target $\beta$)±the permissible value ("Yes": exceeding the region of the permissible value), the recording power is changed".

The patent document 4 discloses an optical disk recording device. In the optical disk recording device, a target ratio for ROPC can be obtained properly even when bending or surface wobbling occurs in an optical disk. The paragraph [0025] discloses that "the target ratio for ROPC is determined by measuring plural pairs of $\beta$ values, calculating an approximate expression of the $\beta$ value and the ratio for ROPC based on the measured plural pairs of $\beta$ values, and substituting the target $\beta$ value into the approximate expression".

The patent document 5 discloses an optical disk device and control method of recording power to shorten recording time and to stabilize recording quality at the same time when controlling recording power to an optical disk. The paragraph [0023] discloses that "the output power is judged to be abnormal and recording is temporarily stopped when the change rate $\Delta M/M0$ is equal to or more than the threshold value (S108). Then, the recorded data just before stopping the recording is regenerated, and then the $\beta$ value ($\beta 1$) is measured by the $\beta$ value detection circuit 8 (S109). And then, an uprate value $\alpha$ is calculated by using the measured value $\beta 1$, $\beta$ value ($\beta 0$) and compensating rate k. $\alpha = 1 + k \times (\beta 0 - \beta 1)$".

The patent document 6 discloses an optical disk recording device and a recording method of an optical disk. It provides the optical disk recording device and the recording method to select optimum recording power in accordance with property of an optical disk and then recording is performed. The paragraph [0038] discloses that "it is possible to calculate an average of $\beta$ values for the recording powers Pxa-Pxj in advance, and to determine the optimal recording power Po from the approximate expression Lb4 of the plots of the average values".

The patent document 7 discloses a disk recording/reproducing device from an alternative perspective. It provides the disk recording/reproducing device to optimally adjust the recording power of an optical beam in consideration of vibrations temporarily applied to an optical disk. The paragraph [0034] discloses that "the OPC processing part 13 obtains the $\beta$ value or the jitter value based on the RF signal more than once, and determines the optimal recording power based on the average of these values when the optical disk 1a is judged to be temporarily exposed to abnormal vibrations during the OPC process".

The patent document 4 discloses an optical disk recording device from an alternative perspective. The paragraphs [0016]-[0017] disclose that "the recording power is controlled so that the ratio of return light and recording power becomes a target value (target ratio) for ROPC that is obtained based on a target β value, which is unique for each optical disk,—as shown in FIG. 2, β values measured for each recording power slightly vary, and the average of the β values for each recording power linearly increases when the recording power is gradually increased from W1 to W4".

The patent document 8 discloses an optical disk recording method. It provides the optical disk recording method capable of stably securing accurate recording characteristics, and recording/reproducing without errors even when there are disk mechanical fluctuation characteristics, pickup rolling characteristics or the like. The paragraphs [0014]-[0015] disclose that "the average value of the β values is 12%, the maximum value is 14%, the minimum value is 10% in the case of FIG. 6. In other words, the β value is found to vary up to 4% for the same recording laser power,—FIG. 7 shows the result of the later five sectors (11th to 15th sector) showing the recording laser power on the abscissa. FIG. 7 is a diagram showing a relation between the power before correction and the β value".

The patent document 9 discloses a power calibration method of an optical disk device. It provides the power calibration method that is hardly affected due to variations in the circumference of a disk, without using a record region beyond one partition. The paragraph [0030] discloses that "the β value detecting circuit 8 obtains the β value of each sector by reproducing the sector area, calculates an average of the β values of each stage respectively for sectors SC05 to SC12, and then the recording laser power determining circuit 13 calculates the laser power most suitable for the recording".

In the above described prior arts, the β value is measured for optimizing the recording power. However, if a track shift occurs when measuring the β value, the measured β value itself is shifted and the recording power cannot be optimized based on the correct β value.

BRIEF SUMMARY OF THE INVENTION

The present invention provides an optical disk recording device and an optical disk recording method to optimize recording power based on the correct β value.

The present invention discloses an optical disk recording device to perform an OPC (Optimum Power Calibration) before recording a signal on an optical disk comprising:
a disk driving unit that drives to rotate an optical disk,
an optical pickup that emits a laser beam to the optical disk driven to rotate by the disk driving unit to read/write the signal,
a signal processing unit that processes the signal read by the optical pickup,
a pickup driving unit that drives the optical pickup, and
a control unit that controls the disk driving unit and the pickup driving unit based on the signal processed at the signal processing unit, wherein
the signal processing unit obtains a measurement value including a modulation value and/or a β value based on a reflected light of the laser beam emitted to the optical disk, and the control unit records/reads the signal on a recording area gradually changing recording power when performing the OPC and judges whether or not a reading operation is retried based on both the measurement value including the modulation value and/or the 0 value obtained by a reading instruction for a predetermined recording area and the measurement value including the modulation value and/or the β value obtained by a reading instruction for another predetermined recording area.

In the above composition, the disk driving unit can drive to rotate the optical disk, the optical pickup can emit the laser beam to the optical disk driven to rotate by the disk driving unit to read/write the signal, and the pickup driving unit can drive the optical pickup. Because the signal processing unit can process the signal read by the optical pickup, the control unit controls the disk driving unit and the pickup driving unit based on the signal processed at the signal processing unit.

In addition, the optical disk recording device performs the OPC (Optimum Power Calibration) before recording the signal on the optical disk. The signal processing unit can obtain the measurement value including the modulation value and/or the β value based on the reflected light of the laser beam emitted to the optical disk, and the control unit records/reads the signal on the recording area gradually changing the recording power when performing the OPC and judges whether or not the reading operation is retried based on both the measurement value including the modulation value and/or the β value obtained by the reading instruction for a predetermined recording area and the measurement value including the modulation value and/or the β value obtained by the reading instruction for another predetermined recording area.

In other words, when the recording operation is performed gradually changing the recording power (e.g. gradual emission: gradually reducing the recording power), the measurement value including the modulation value and/or the β value should be a predetermined value depending on a recording area. By using the above feature, the measurement value including the modulation value and/or the β value obtained by a reading instruction for a predetermined recording area is compared to the measurement value estimated from the recording power. The obtained measurement value may be too large or too small compared to the estimated measurement value, or magnitude relation between certain areas may be relatively abnormal. In such a case, it is indicated that the actuary read recording area does not match the reading instruction. Therefore, the reading operation is determined to be retried.

In the above process, the optical disk recording device and the optical disk recording method of the present invention use the measurement value including the modulation value and/or the β value. In other words, the optical disk recording device and the optical disk recording method of the present invention include following three aspects. The first aspect is to use both the modulation value and the β value, the second aspect is to use only the modulation value, and the third aspect is to use only the β value. Of course, the present invention does not exclude the aspects jointly using other measurement values.

In the present invention, by adding a retry process (process for reading the β value again) when measuring the β value, whether or not the track shift occurs can be judged and therefore the β value can be correctly measured even at a recording area recorded with high power.

DETAILED DESCRIPTION OF THE INVENTION (Embodiment 1)

Hereafter, an embodiment of the present invention will be explained based on the drawings.

Figure 1:
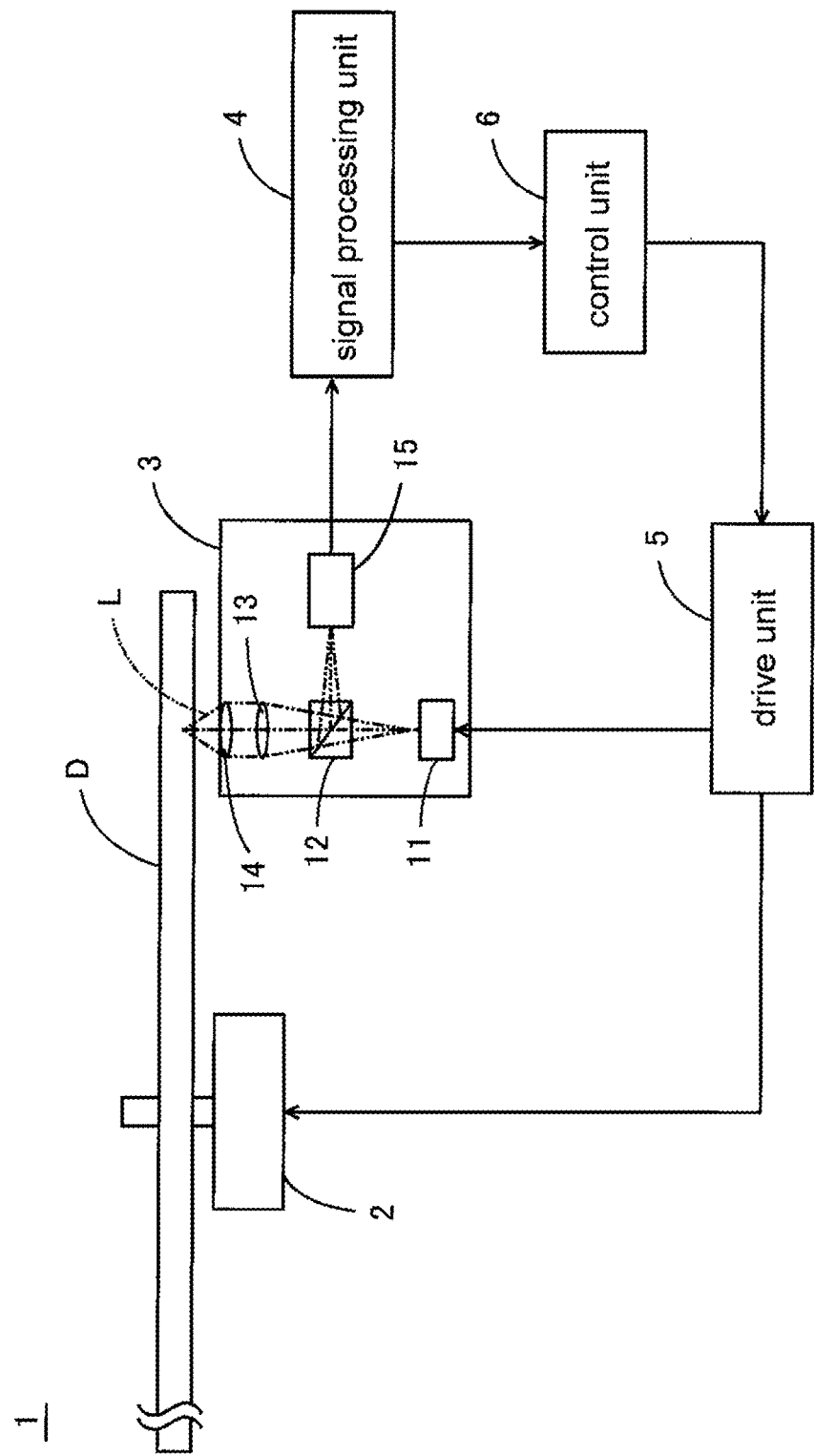
FIG. 1 is a block diagram showing a schematic configuration of an optical disk recording device.

FIG. 1 shows an optical disk recording device concerning an embodiment of the present invention with a schematic block diagram.

An optical disk recording device 1 has a spindle motor (disk driving unit) 2 for driving to rotate an optical disk D, an optical pickup 3 for emitting a laser beam L to the rotating optical disk D in order to read/write a signal, a signal processing unit 4 for processing the signal read by the optical pickup 3, a drive unit (disk driving unit, pickup driving unit) 5 for applying a driving voltage to the spindle motor 2 and the optical pickup 3, and a control unit 6 for controlling each part of the device, and so on. The control unit 6 controls, for example, the spindle motor 2 and the optical pickup 3 via the drive unit 5 based on the signal processed at the signal processing unit 4.

The optical pickup 3 has a laser diode (light emitting element) 11 for emitting a laser beam, a collimator lens 13 for collimating the laser beam emitted from the laser diode to parallel rays, an objective lens 14 for focusing the laser beam passed through the collimator lens 13 on a recording surface of the optical disk D, a beam splitter 12 for transmitting the laser beam emitted from the laser diode 11 to the collimator lens 13 and reflecting the laser beam, which is reflected from the recording surface of the optical disk D and then passed through the objective lens 14 and the collimator lens 13, to a photodiode 15, a photodiode (light receiving element) 15 for receiving the laser beam reflected by the beam splitter 12, and so on.

In general, in order to improve the recording quality, the optical disk recording device performs an OPC (Optimum Power Calibration) at a PCA (Power Calibration Area) of the optical disk before recording the signal on the optical disk. After that, while recording the signal on the optical disk, the light receiving element receives the laser beam (return light) that is reflected from the recording surface of the optical disk enabling to perform an ROPC (Running Optimum Power Calibration) simultaneously with the recording of the signal.

Note that the ROPC is performed by adjusting a recording power so that a ratio between an amount of the return light and the recording power becomes a target ratio (target value of ROPC ratio) calculated based on a target β value, which is individually determined for each optical disk. Therefore, when performing the ROPC, it is important for the optical disk recording device to obtain a proper target ratio.

Figure 2:
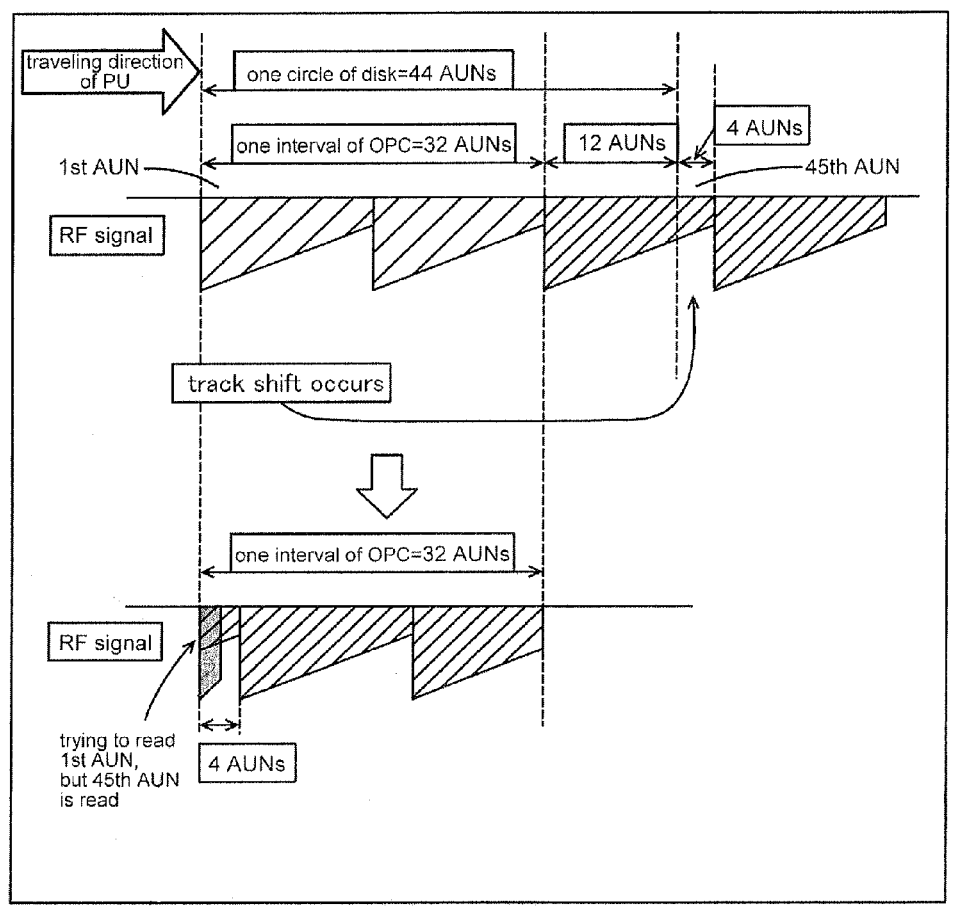
FIG. 2 is an explanatory diagram showing a waveform of an RF signal when performing a reading operation of an OPC.

Here, a track shift that occurs when performing the OPC will be explained. FIG. 2 shows a relation between the track shift and a waveform of an RF signal when performing a reading operation of the OPC. The figure shows a waveform of an RF signal on a triple-layered Blu-ray disc (BD-R/RE). When performing the OPC, the signal is recorded by a gradual emission of the laser beam. The gradual emission means to perform a recording operation by gradually reducing the recording power. A recording area of the Blu-ray Disk is expressed in a unit of AUN (Address Unit Number). The recording operation is performed by separating 32 AUNs, which are aligned along a traveling direction of an optical pickup unit (PU), into two parts and gradually reducing the recording power in each of 16 AUNs from the maximum power to the minimum power (gradual emission).

As explained above, one interval of the OPC includes 32 AUNs. On the other hand, one circle of the Blu-ray Disk is corresponding to 44 AUNs. Therefore, when reading the beginning of the interval of the OPC (the position shown on the upper left of FIG. 2), if the track shift occurs causing to read the next track, the actually read recording area is 44 AUNs forward from the correct beginning position.

It is known that such a track shift occurs especially at an area where the recording operation is performed with high power (high output) in the OPC. Therefore, when performing the reading operation after the recording operation is performed by the gradual emission of the OPC, if the track shift occurs at the recording area where the recording operation is performed with high output, the recording area of 45th AUN, which is shown next to the 44th AUN in the upper right of FIG. 2, is erroneously read as the recording area of the 1st AUN.

In such a case, the actually read recording area is not the 1st AUN. Therefore, the recording power is not high output and the output of the RF signal is corresponding to the recording area that is recorded with lower output. Although the gray colored area in FIG. 2 is the RF signal to be read under a normal situation, but the slashed area is the RF signal actually read.

Figure 3:
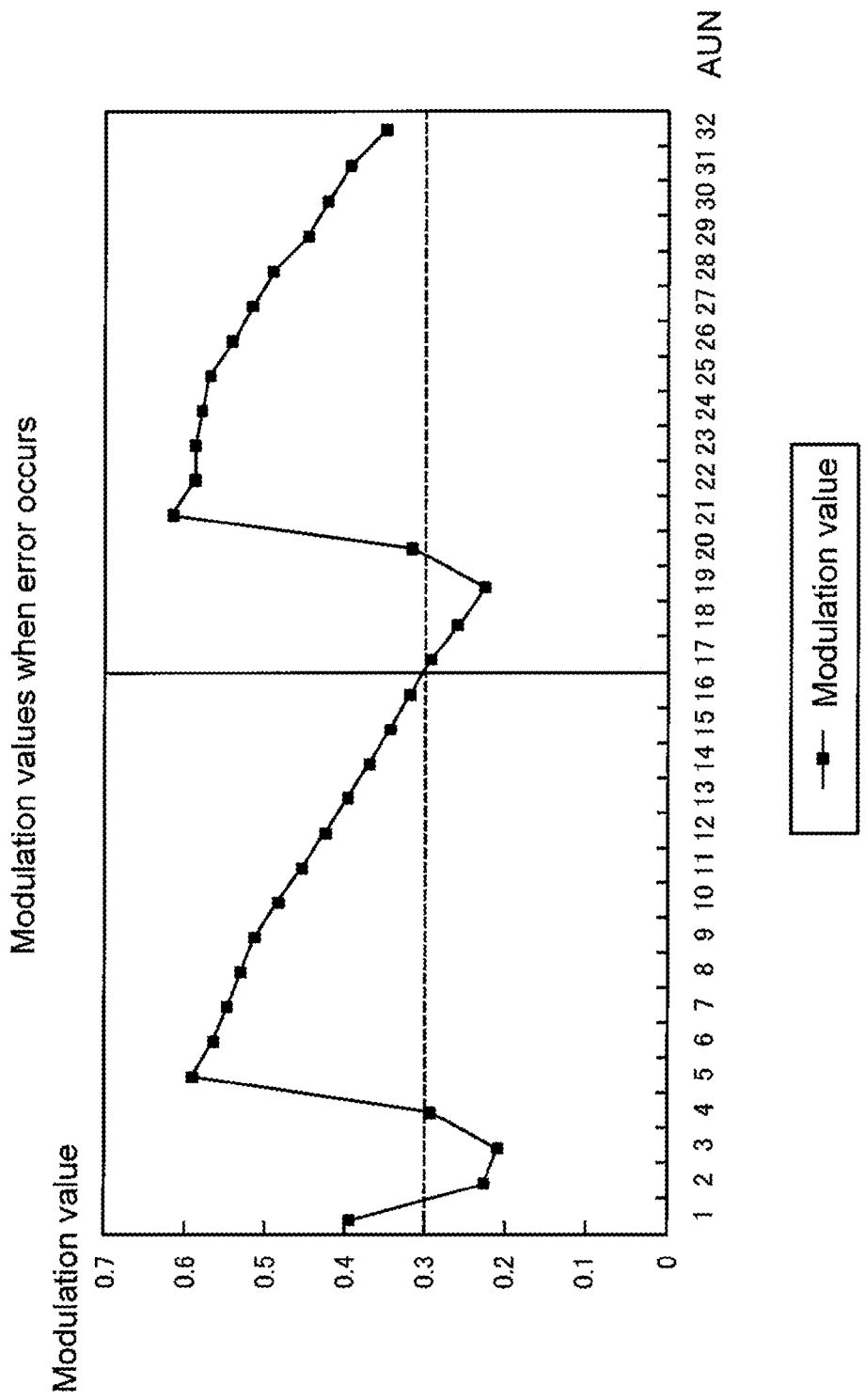
FIG. 3 is a graph showing a change of a modulation value in case a track shift occurs when performing the reading operation of the OPC.

As a result, the modulation value obtained from the measured β value is shown in FIG. 3. Here, FIG. 3 is a graph showing a change of the modulation value in case the track shift occurs when performing the reading operation of the OPC.

The modulation value of the 1st AUN, which should be the highest value under a normal situation, is lower than the modulation value of the 5th AUN. Similarly, the modulation values of the 2nd to 4th AUNs are lower than the modulation value of the 5th AUN. Under a normal situation, the modulation value should be gradually reduced from the maximum power and that is repeated twice in one interval of the OPC. However, as shown in the figure, the maximum power is not started from the correct beginning position, and therefore the output is not a regular two-stage gradual emission.

Thus, if the track shift occurs in the triple-layered Blu-ray disc as shown in FIG. 2, the recording area, which was formerly recorded area by performing the OPC, is incorrectly read and therefore the RF signal is shown as the lower part in the figure. As a result, the measured data becomes abnormal at the beginning 4 AUNs.

Conventionally, if the track shift occurs at the recording area recorded with high power, the recording power is derived without matching the optimal recording power because of the incorrect measurement value measured based on an incorrect relation between the recording power and the β value. Therefore, the recording quality may be deteriorated if the disk is used without any change.

Figure 4:
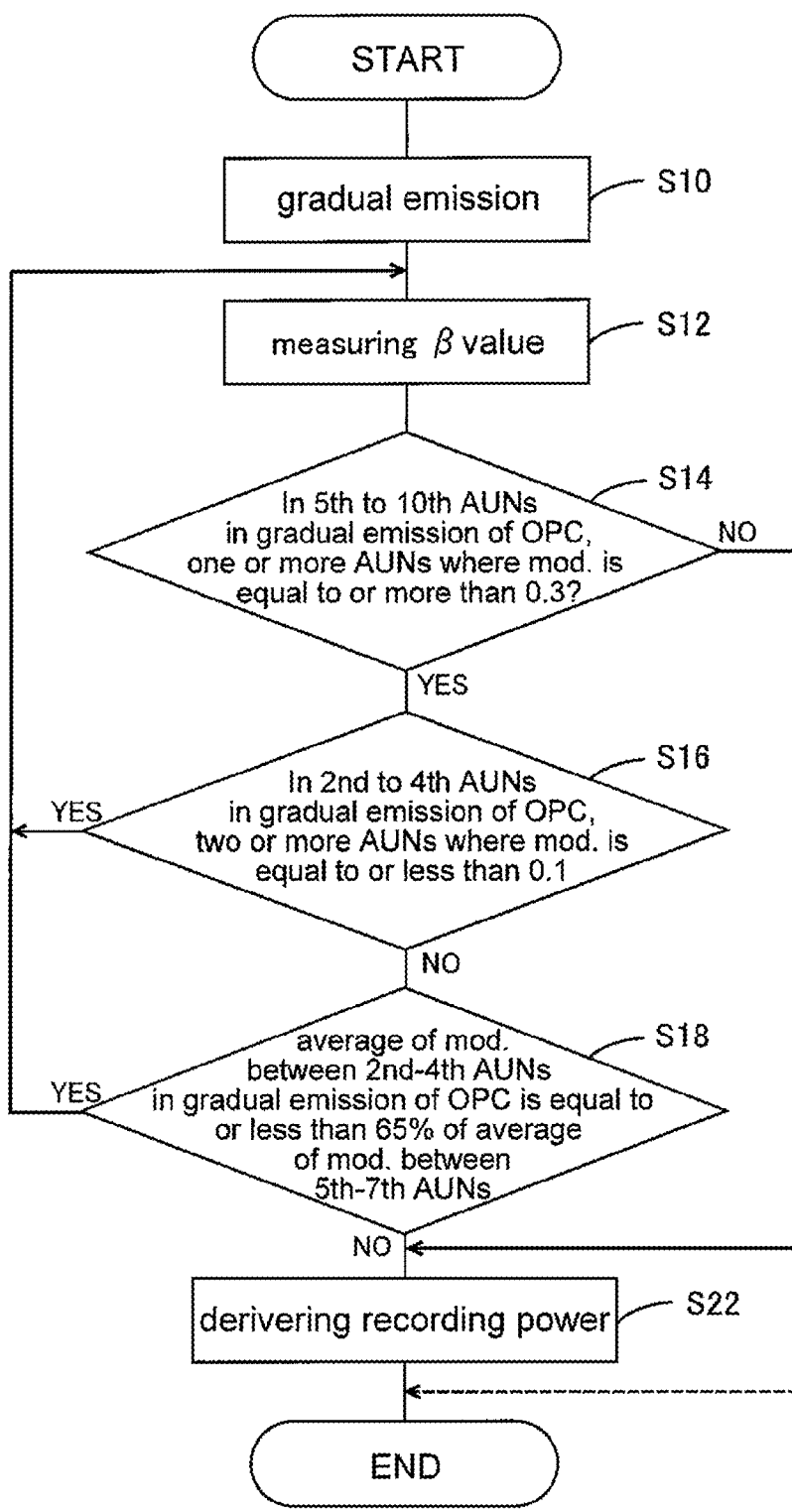
FIG. 4 is a flowchart of a program to properly perform the reading operation of the OPC.

FIG. 4 is a flowchart of a program to properly perform the reading operation of the OPC. The control unit 6 includes such as a CPU that is capable of processing programs to achieve the operation shown in the flowchart of FIG. 4. In the operation, the track shift is judged by the following requirements for retrying the reading operation of the OPC.

Requirement 1: Check if there is one or more AUNs where the modulation value is equal to or more than 0.3 in the 5th to 10th AUNs of the gradual emission of the OPC because the track shift occurs only at a recording area recorded with high power. If the requirement is not satisfied, the following requirements 2 and 3 will not be judged.

Requirement 2: Check if there are two or more AUNs where the modulation value is equal to or less than 0.1 in the 2nd to 4th AUNs of the gradual emission of the OPC because the β value cannot be correctly measured at the area where the modulation value is equal to or less than 0.1. If the requirement is satisfied, the situation is considered to be abnormal and the measurement of the β value is retried.

Requirement 3: Check if the average of the modulation values between the 2nd and 4th AUNs in the gradual emission of the OPC is equal to or less than 65% of the average of the modulation values between the 5th and 7th AUNs. If the requirement is satisfied, the situation is considered to be abnormal and the measurement of the β value is retried.

Note that the modulation value is abbreviated as "mod." in the flowchart because of space limitations.

The process of the OPC using the above requirements will be explained. At first, the gradual emission is performed in the step 10. Then, the β value is measured in the step 12 (also called as a β measurement). In the present embodiment, specifically, the β value and the modulation value are used as a measurement value that is approximately proportional to the recording power and can be obtained based on the reflected light of the laser beam emitted to the optical disk.

The requirement 1 is judged in the step 14. In other words, it is checked that if there is one or more AUNs where the modulation value is equal to or more than 0.3 in the 5th to 10th AUNs of the gradual emission of the OPC. If the track shift occurs, the 5th to 10th AUNs actuary read are corresponding to the 1st to 5th AUNs of the original recording area. This can be easily understood by shifting the graph of FIG. 3 where the track shift occurs. The measurement values obtained from the recording area of the 9th to 14th AUNs in FIG. 3 should be the modulation values of the original 5th to 10th AUNs if the track shift does not occur. In the graph of FIG. 3, both the modulation values of the 9th to 14th AUNs and the modulation values of the 5th to 10th AUNs are obviously more than 0.3. In such a case, go to the requirement 2 and the requirement 3. Note that, in the above process, the measurement values (modulation values) obtained from a predetermined area (5th to 10th AUNs) are compared with a measurement value estimated from the recording power, and it is judged if the obtained values are too smaller than the estimated value.

If the obtained values are less than 0.3. at least 5th to 10th AUNs are not recorded with high output and therefore the track shift can not occur. Therefore, the requirement 2 and the requirement 3 will not be judged. In such a case, it is possible to skip the requirements 2 and 3 and go to the step 22 to derive optimal recording power, or to separately execute an error processing by reason of that the recording power cannot be derived correctly.

Then, the requirement 2 is judged in the step 16. In other words, it is checked that if there are two or more AUNs where the modulation value is equal to or less than 0.1 in the 2nd to 4th AUNs of the gradual emission of the OPC. If the requirement is satisfied, the situation is judged to be abnormal and the measurement of the β value is retried. This is because signal level is too small at the place where the modulation value is less than 0.1 to properly output the β value. In the above process, similar to the requirement 1, the measurement values (modulation values) obtained from a predetermined area (2nd to 4th AUNs) are compared with a measurement value estimated from the recording power, and it is judged if the obtained values are too smaller than the estimated value.

The above requirements are judged by comparing the modulation values with an absolute requirement. Therefore, there is a limit to improve reliability because the specification of the disk is different depending on the manufacturer. Even if a tolerance is specified, relatively large margin is required.

On the other hand, in the requirement 3 judged in the step 18, the margin can be reduced even when the specification is different depending on the manufacturer because the judgment is based on a relative requirement. In the requirement 3, it is checked that if the average of the modulation values between the 2nd and 4th AUNs is equal to or less than 65% of the average of the modulation values between the 5th and 7th AUNs. If the requirement is satisfied, the track shift is judged to occur and the measurement of the β value is retried.

In the above process, the modulation values obtained by a reading instruction for the recording area recorded with high output (2nd to 4th AUNs) are compared with the modulation values obtained by a reading instruction for the recording area recorded with lower output (5th to 7th AUNs) to judge whether or not the reading operation is retried. More specifically, whether magnitude relation between the above two modulation values matches the correct magnitude relation or not is judged. Although the modulation values of the recording area recorded with high output (2nd to 4th AUNs) should be larger than the modulation values of the recording area recorded with lower output (5th to 7th AUNs), whether the magnitude relation of the measurement values is reversed or not is judged. Furthermore, if the magnitude relation of the measurement values is reversed, the obtained modulation value is supposed to match the modulation value of the neighbor track that is erroneously read because of the track shift when reading the recording area recorded with high output. Therefore, the estimated magnitude relation should be different from the correct magnitude relation. Note that the modulation value is used for the judgment in the present embodiment. However, as explained later, the β value itself can be also used or other measurement values can be also used for relative evaluation. Strictly speaking, the measurement value should be expressed as "a measurement value obtained by a reading instruction for a predetermined recording area", but it is expressed as merely "a measurement value of a predetermined recording area" hereafter.

In the step 18, firstly, an average of the modulation values between the 2nd and 4th AUNs is calculated. Then, an average of the modulation values between the 5th and 7th AUNs is calculated. If the latter average is equal to or more than 65% of the former average, the track shift is judged to occur. Of course, the value of 65% does not have to be strictly judged. Some margin is allowed when judging. For example, a certain threshold value (e.g. from 50% to 80%) can be arbitrarily determined by an experiment.

In addition, using the average is only an example. This does not mean to exclude similar algorithm such as an intermediate value or a weighted average value to consider gradually reduced relation.

If the above requirement is not satisfied, the track shift does not occur. Therefore, optimal recording power is derived in the step 22 to adjust the range of the recording power that differs depending on the manufacturer. The deriving method is not particularly limited and publicly known methods can be employed.

(Embodiment 2)

In the above described embodiment, the modulation value is used as the measurement value. On the other hand, the β value itself is used in the present embodiment.

Figure 5:
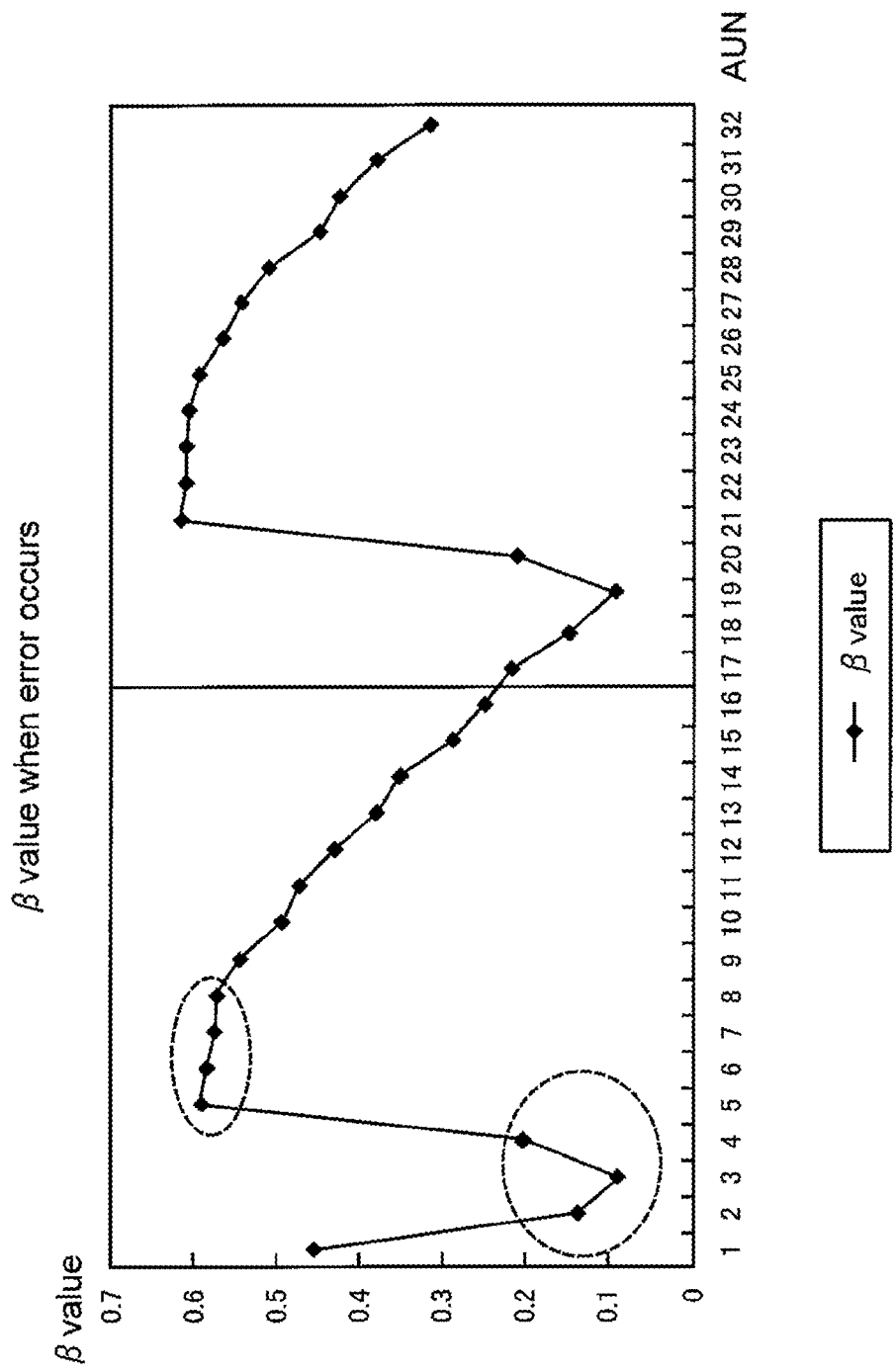
FIG. 5 is a graph showing a change of a β value in case a track shift occurs when performing the reading operation of the OPC.
Figure 6:
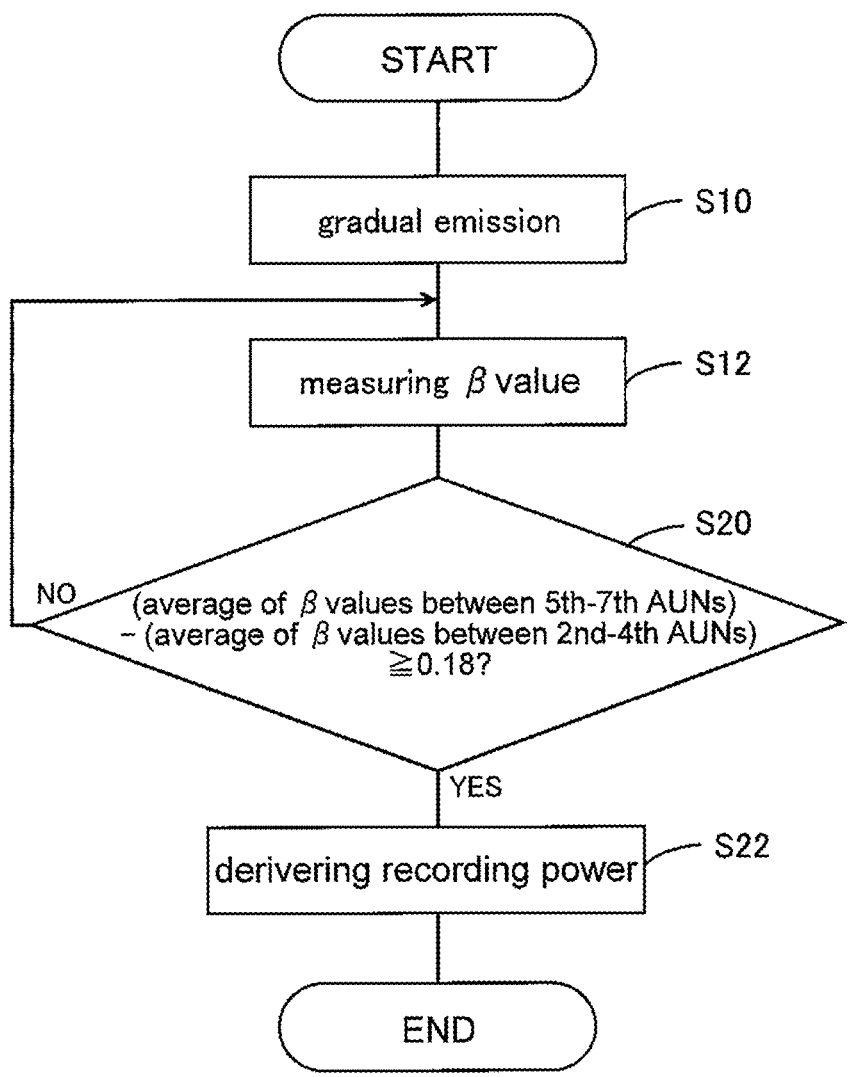
FIG. 6 is a flowchart of a program to properly perform the reading operation of the OPC.

FIG. 5 is a graph showing a change of the β value in case the track shift occurs when performing the reading operation of the OPC. FIG. 6 is a flowchart of a program to properly perform the reading operation of the OPC. As shown in FIG. 5, the β value varies in the almost same manner as the modulation value, although a range of values differs. If the track shift occurs causing to read the recording area of the next or previous track, the change of the measurement value is shifted in a regular manner.

Therefore, in the step 20 of the flowchart of FIG. 6, the following requirement is judged.

Requirement 4: Check if the β values when performing the reading operation in the gradual emission of the OPC meets the following relation:

(average of β values between 5th and 7th AUNs)−
(average of β values between 2nd and 4th AUNs)≥
0.18

If the requirement is satisfied, the track shift is judged to occur.

In other words, the gradual emission is performed in the step 10, the β value is measured in the step 12, and then the above requirement is judged in the step 20. Note that, same as the step 18, other algorithm than the average can be used, the threshold value of "0.18" can be changed, or other conditions can be changed arbitrarily according to an environment. Also in the present embodiment, some conditions could be actuary changed. The conditions can be significantly changed depending on the kind of optical disks that will be produced in the future.

In the above process, the β values obtained by a reading instruction for the recording area recorded with high output (2nd to 4th AUNs) are compared with the β values obtained by a reading instruction for the recording area recorded with lower output (5th to 7th AUNs) to judge if the reading operation is retried. More specifically, whether magnitude relation between the above two β values matches the correct magnitude relation or not is judged. Also, whether the difference between the β values obtained by a reading instruction for the recording area recorded with high output (2nd to 4th AUNs) and the β values obtained by a reading instruction for the recording area recorded with lower output (5th to 7th AUNs) is equal to or more than the predetermined value (0.18) or not is judged. Furthermore, if the requirement is satisfied, the obtained β value is supposed to match the β value of the neighbor track that is erroneously read because of the track shift when reading the recording area recorded with high output. Therefore, the estimated magnitude relation should be different from the correct magnitude relation. The above process can be also used for the judgment based on the modulation value in stead of the β value.

In the step 18 or the step 20, the track shift can be considered not to be solved when the number of the retry exceeds a predetermined number. In such a case, it is possible to slightly reduce the maximum value of the gradual emission when performing the OPC and retry the recording in the step 10.

(Embodiment 3)

In the above described embodiments, the 2nd to 4th AUNs are selected as the recording area recorded with high output, and the 5th to 7th AUNs are selected as the recording area recorded with lower output. However, the recording area is actually different depending on the kind of the optical disk. Hereafter, the explanation will be given about various kinds of the optical disks.

Figure 7:
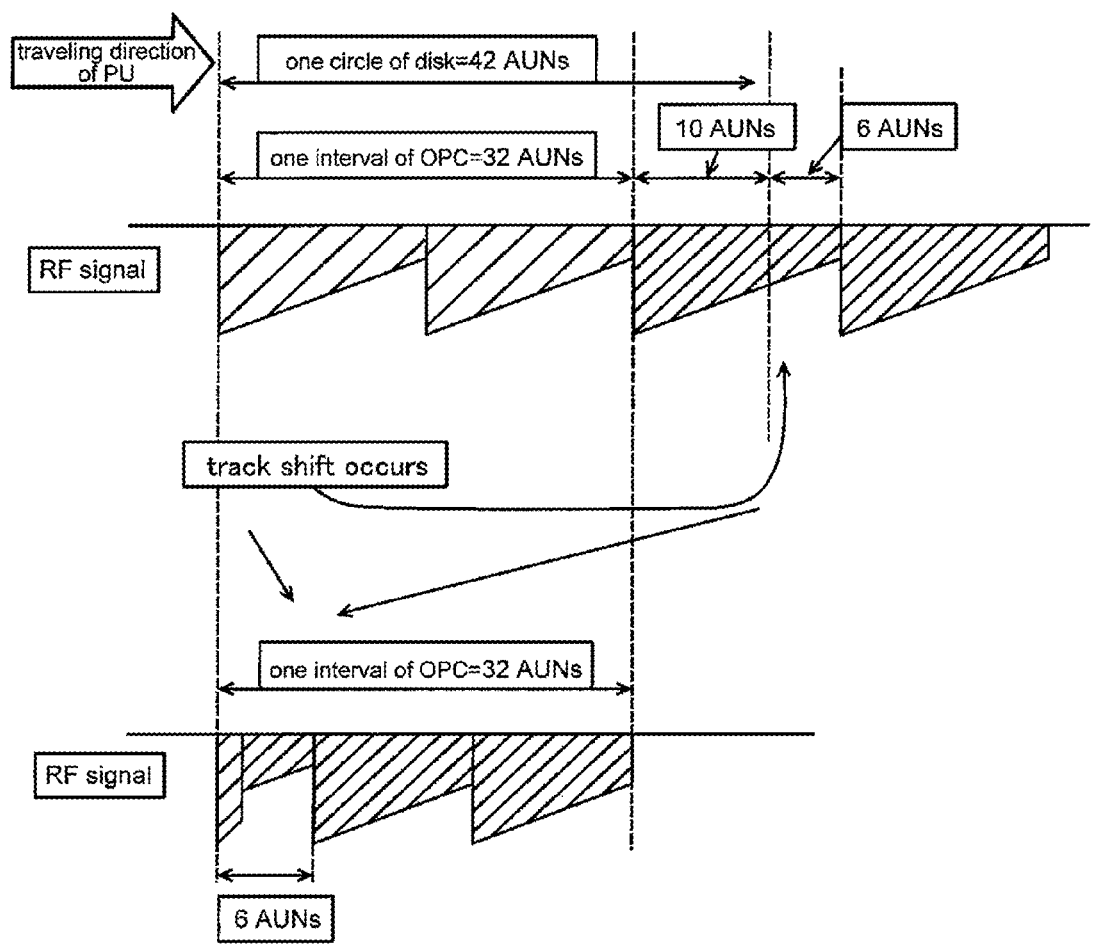
FIG. 7 is an explanatory diagram showing a waveform of the RF signal when performing the reading operation of the OPC on a quadruple-layered Blu-ray disc.

At first, an example of a quadruple-layered Blu-ray disc will be explained. FIG. 7 is an explanatory diagram showing a waveform of the RF signal when performing the reading operation of the OPC on the quadruple-layered Blu-ray disc.

In the quadruple-layered Blu-ray disc, as shown in the upper part of FIG. 7, 42 AUNs are assigned to one circle of the disk. On the other hand, one interval of the OPC includes 32 AUNs, which is common for all Blu-ray Disks. Therefore, if the track shift occurs when reading the 1st AUN, the actually read recording area is 43rd AUN, which is 10 AUNs forward from the beginning of the interval of the OPC. As a result, as shown in the lower part of FIG. 7, the beginning 6 AUNs, which should be the recording area recorded with high output, are corresponding to the end 6 AUNs recorded with lower output in the gradual emission because of the track shift.

Because the recording power is significantly different between the 6th AUN and the 7th AUN, the 4th to 6th AUNs are selected as the recording area recorded with high output, and the 7th to 9th AUNs are selected as the recording area recorded with lower output in the present embodiment when calculating the average to judge the magnitude relation between both areas.

(Embodiment 4)

Figure 8:
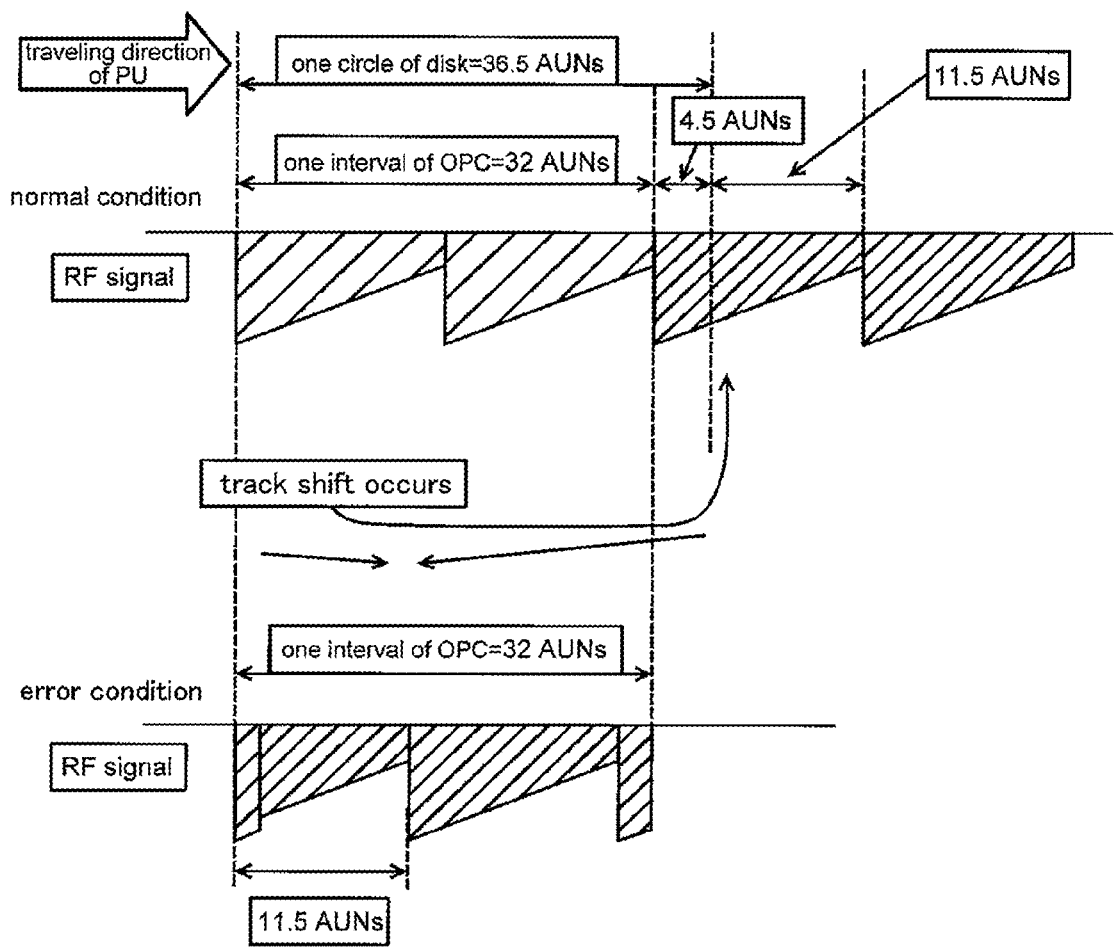
FIG. 8 is an explanatory diagram showing a waveform of the RF signal when performing the reading operation of the OPC on a single-layered or double-layered Blu-ray disc.

Then, an example of a single-layered or double-layered Blu-ray disc will be explained. FIG. 8 is an explanatory diagram showing a waveform of the RF signal when performing the reading operation of the OPC on the single-layered or double-layered Blu-ray disc.

In the single-layered or double-layered Blu-ray disc, as shown in the upper part of FIG. 8, 36.5 AUNs are assigned to one circle of the disk. On the other hand, one interval of the OPC includes 32 AUNs, which is common for all Blu-ray Disks. Therefore, if the track shift occurs when reading the 1st AUN, the actually read recording area is 37.5th AUN, which is 4.5 AUNs forward from the beginning of the interval of the OPC. As a result, as shown in the lower part of FIG. 8, the beginning 11.5 AUNs, which should be the recording area recorded with high output, are corresponding to the end 11.5 AUNs recorded with lower output in the gradual emission because of the track shift.

Because the recording power is significantly different between the 11.5th AUN and the 12.5th AUN, the 8th to 10th AUNs are selected as the recording area recorded with high output, and the 12th to 14th AUNs are selected as the recording area recorded with lower output in the present embodiment when calculating the average to judge the magnitude relation between both areas. At that time, the 11th AUN is avoided because a signal variation occurs at the 11th AUN.

(Embodiment 5)

Figure 9:
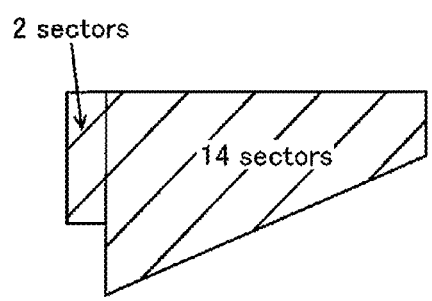
FIG. 9 is an explanatory diagram showing a change of a recording power of the OPC on a single-layered or double-layered DVD-R.
Figure 10:
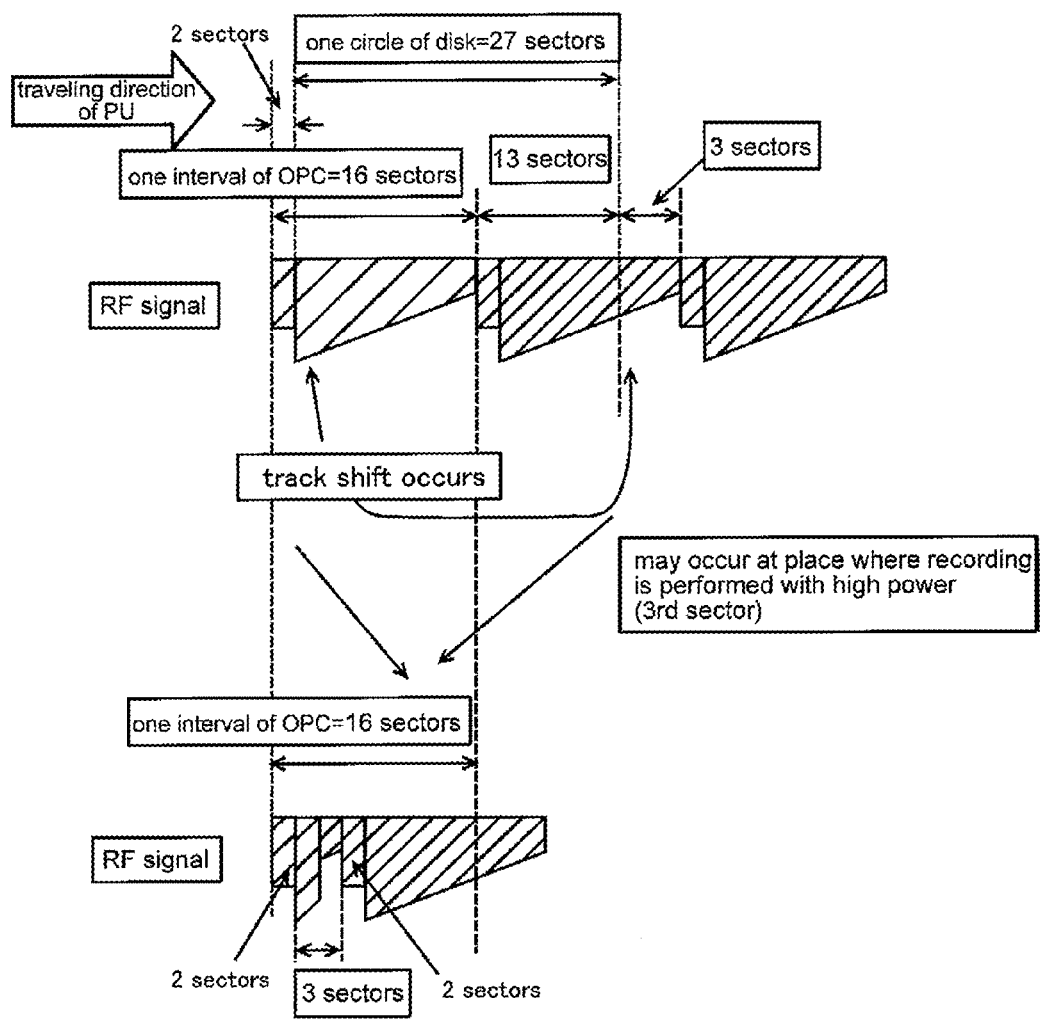
FIG. 10 is an explanatory diagram showing a waveform of the RF signal when performing the reading operation of the OPC on the single-layered or double-layered DVD-R.

Then, an example of a single-layered or double-layered DVD-R will be explained. FIG. 9 shows a change of a recording power of the OPC on the single-layered or double-layered DVD-R. FIG. 10 is an explanatory diagram showing a waveform of the RF signal when performing the reading operation of the OPC on the single-layered or double-layered DVD-R.

In the DVD-R, different from the Blu-ray Disk, as shown in FIG. 9, 2 sectors are recorded with a constant power and then 14 sectors are recorded with a fluctuating power. As a result, 16 sectors are used in one interval.

In the DVD-R, as shown in the upper part of FIG. 10, 27 sectors are assigned to one circle of the disk. On the other hand, one interval of the OPC includes 16 sectors. Therefore, if the track shift occurs when reading the 3rd track, the actually read recording area is 30th track, which is shifted 13 tracks from the beginning of the interval of the OPC. As a result, as shown in the lower part of FIG. 10, the beginning 3 sectors after 2 sectors recorded with the constant power, which should be the recording area recorded with high output, are corresponding to the end 3 sectors recorded with lower output in the gradual emission because of the track shift.

Although the recording power is significantly different between the 5th sector and the 6th sector, in consideration of the following sectors (6th and 7th sectors) recorded with the constant power, the 4th to 5th sectors are selected as the recording area recorded with high output, and the 8th to 10th sectors are selected as the recording area recorded with lower output in the present embodiment when calculating the average to judge the magnitude relation between both areas.

(Embodiment 6)

Figure 11:
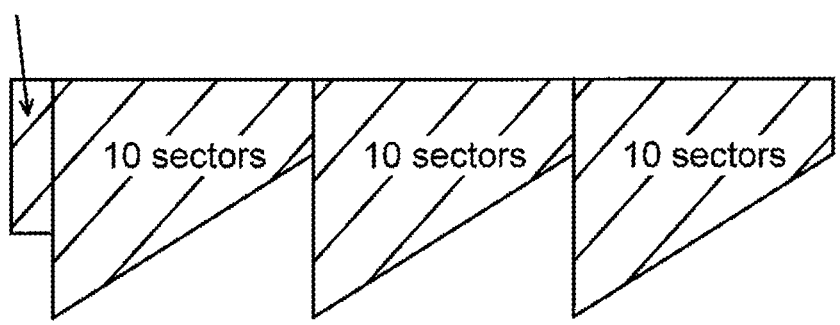
FIG. 11 is an explanatory diagram showing a change of the recording power of the OPC on a single-layered or double-layered DVD-RW.
Figure 12:
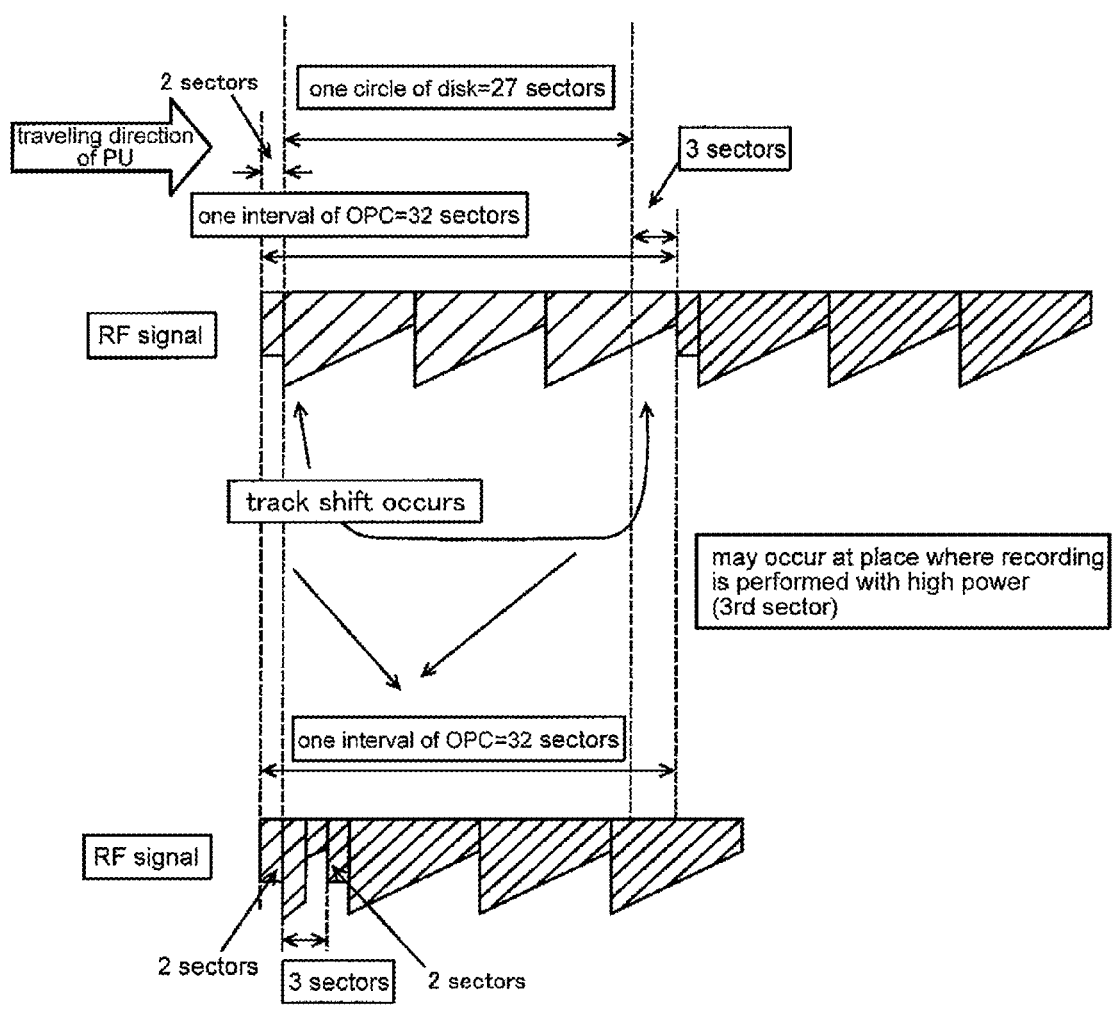
FIG. 12 is an explanatory diagram showing a waveform of the RF signal when performing the reading operation of the OPC on the single-layered or double-layered DVD-RW.

Then, an example of a DVD-RW will be explained. FIG. 11 shows a change of a recording power of the OPC on the DVD-RW. FIG. 12 is an explanatory diagram showing a waveform of the RF signal when performing the reading operation of the OPC on the DVD-RW.

In the DVD-R, as shown in FIG. 11, 2 sectors are recorded with a constant power and then 10 sectors are recorded with a fluctuating power three times. As a result, 32 sectors are used in one interval.

In the DVD-R, as shown in the upper part of FIG. 12, 27 sectors are assigned to one circle of the disk. On the other hand, one interval of the OPC includes 32 sectors. Therefore, if the track shift occurs when reading the 3rd track, the actually read recording area is 30th track, which is the last 3 sectors recorded with the fluctuating power. As a result, as shown in the lower part of FIG. 12, the beginning 3 sectors after 2 sectors recorded with the constant power, which should be the recording area recorded with high output, are corresponding to the end 3 sectors recorded with lower output in the gradual emission because of the track shift.

Although the recording power is significantly different between the 7th sector and the 8th sector, in consideration of the following sectors (8th and 9th sectors) recorded with the constant power, the 5th to 7th sectors are selected as the recording area recorded with high output, and the 10th to 12th sectors are selected as the recording area recorded with lower output in the present embodiment when calculating the average to judge the magnitude relation between both areas.

As explained above, if the average of the modulation values between the 2nd and 4th AUNs is equal to or less than 65% of the average of the modulation values between the 5th and 7th AUNs, the track shift is judged to occur and the measurement of the β value is retried.

In other words, the modulation values of the recording area recorded with high output (2nd to 4th AUNs) are compared with the modulation values of the recording area recorded with lower output (5th to 7th AUNs) and whether magnitude relation between the above two modulation values matches the correct magnitude relation or not is judged.

In addition, after the gradual emission is performed in the step 10 and the β value is measured in the step 12, the following requirement is judged in the step 20:

(average of β values between 5th and 7th AUNs)−
(average of β values between 2nd and 4th AUNs)≥
0.18

If the requirement is satisfied, the track shift is judged to occur. This means to judge whether the difference between the β values of the recording area recorded with high output (2nd to 4th AUNs) and the β values of the recording area recorded with lower output (5th to 7th AUNs) is equal to or more than the predetermined value (0.18) or not.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. An optical disk recording device to perform an OPC (Optimum Power Calibration) before recording a signal on an optical disk comprising:

a disk driving unit that drives to rotate an optical disk, an optical pickup that emits a laser beam to the optical disk driven to rotate by the disk driving unit to read/write the signal, a signal processing unit that processes the signal read by the optical pickup, a pickup driving unit that drives the optical pickup, and a control unit that controls the disk driving unit and the pickup driving unit based on the signal processed at the signal processing unit, wherein the signal processing unit obtains a measurement value including a modulation value and/or a β value based on a reflected light of the laser beam emitted to the optical disk, and the control unit records/reads the signal on a recording area gradually changing recording power when performing the OPC, measures both the measurement value including the modulation value and/or the β value obtained by a reading instruction for a predetermined recording area determined by a kind of the disk and the measurement value including the modulation value and/or the β value obtained by a reading instruction for another predetermined recording area determined by the kind of the disk, and retries a reading operation when a magnitude relation between two measurement values does not match a correct magnitude relation, which is a magnitude relation when recording the signal.

2. The optical disk recording device according to claim 1, wherein the control unit determines to retry the reading operation when the measurement value including the modulation value and/or the β value obtained by a reading instruction for the recording area recorded with high output is smaller than the measurement value including the modulation value and/or the β value obtained by a reading instruction for the recording area recorded with lower output.

3. The optical disk recording device according to claim 1, wherein the control unit determines to retry the reading operation when the measurement value including the modulation value and/or the β value obtained by a reading instruction for the recording area recorded with high output, which is obtained when track shift occurs causing to read a neighbor track, is smaller than the measurement value including the modulation value and/or the β value obtained by a reading instruction for the recording area recorded with lower output.

4. The optical disk recording device according to claim 2, wherein the optical disk is a Blu-ray Disk, and the recording area is specified in a unit of AUN.

5. The optical disk recording device according to claim 4, wherein the optical disk is a triple-layered Blu-ray Disk,
the recording area recorded with high output is 2nd to 4th AUNs,
the recording area recorded with lower output is 5th to 7th AUNs, and
the control unit determines to retry the reading operation when an average of the modulation values of the recording area recorded with high output is equal to or less than 65% of an average of the modulation values of the recording area recorded with lower output.

6. The optical disk recording device according to claim 4, wherein the optical disk is a quadruple-layered Blu-ray Disk,
the recording area recorded with high output is 4th to 6th AUNs,
the recording area recorded with lower output is 7th to 9th AUNs, and
the control unit determines to retry the reading operation when an average of the modulation values of the recording area recorded with high output is equal to or less than 65% of an average of the modulation values of the recording area recorded with lower output.

7. The optical disk recording device according to claim 4, wherein the optical disk is a single-layered or double-layered Blu-ray disc,
the recording area recorded with high output is 8th to 10th AUNs,
the recording area recorded with lower output is 12th to 14th AUNs, and
the control unit determines to retry the reading operation when an average of the modulation values of the recording area recorded with high output is equal to or less than 65% of an average of the modulation values of the recording area recorded with lower output.

8. The optical disk recording device according to claim 2, wherein the optical disk is a DVD, and
the recording area is specified in a unit of sector.

9. The optical disk recording device according to claim 8, wherein the optical disk is a DVD-R,
the recording area recorded with high output is 4th to 5th sectors,
the recording area recorded with lower output is 8th to 10th sectors, and
the control unit determines to retry the reading operation when an average of the modulation values of the recording area recorded with high output is equal to or less than 65% of an average of the modulation values of the recording area recorded with lower output.

10. The optical disk recording device according to claim 8, wherein the optical disk is a DVD-RW,
the recording area recorded with high output is 5th to 7th sectors,
the recording area recorded with lower output is 10th to 12th sectors, and
the control unit determines to retry the reading operation when an average of the modulation values of the recording area recorded with high output is equal to or less than 65% of an average of the modulation values of the recording area recorded with lower output.

11. The optical disk recording device according to claim 4, wherein the optical disk is a triple-layered Blu-ray Disk,
the recording area recorded with high output is 2nd to 4th AUNs,
the recording area recorded with lower output is 5th to 7th AUNs, and
the control unit determines to retry the reading operation when difference between an average of the β values of the recording area recorded with high output and an average of the β values of the recording area recorded with lower output is equal to or more than 0.18.

12. The optical disk recording device according to claim 4, wherein the optical disk is a quadruple-layered Blu-ray Disk,
the recording area recorded with high output is 4th to 6th AUNs,
the recording area recorded with lower output is 7th to 9th AUNs, and
the control unit determines to retry the reading operation when difference between an average of the β values of the recording area recorded with high output and an average of the β values of the recording area recorded with lower output is equal to or more than 0.18.

13. The optical disk recording device according to claim 4, wherein the optical disk is a single-layered or double-layered Blu-ray disc,
the recording area recorded with high output is 8th to 10th AUNs,
the recording area recorded with lower output is 12th to 14th AUNs, and
the control unit determines to retry the reading operation when difference between an average of the β values of the recording area recorded with high output and an average of the β values of the recording area recorded with lower output is equal to or more than 0.18.

14. The optical disk recording device according to claim 8, wherein the optical disk is a DVD-R,
the recording area recorded with high output is 4th to 5th sectors,
the recording area recorded with lower output is 8th to 10th sectors, and the control unit determines to retry the reading operation when difference between an average of the β values of the recording area recorded with high output and an average of the β values of the recording area recorded with lower output is equal to or more than 0.18.

15. The optical disk recording device according to claim 8, wherein the optical disk is a DVD-RW, the recording area recorded with high output is 5th to 7th sectors, the recording area recorded with lower output is 10th to 12th sectors, and the control unit determines to retry the reading operation when difference between the β values of the recording area recorded with high output and the β values of the recording area recorded with lower output is equal to or more than 0.18.

16. An optical disk recording method in an optical disk recording device to perform an OPC (Optimum Power Calibration) before recording a signal on an optical disk, the optical disk recording device comprising:

a disk driving unit for driving to rotate an optical disk, an optical pickup for emitting a laser beam to the optical disk driven to rotate by the disk driving unit to read/write the signal, a signal processing unit for processing the signal read by the optical pickup, a pickup driving unit for driving the optical pickup, and a control unit for controlling the disk driving unit and the pickup driving unit based on the signal processed at the signal processing unit, the method comprising the steps of:

obtaining a measurement value including a modulation value and/or a β value based on a reflected light of the laser beam emitted to the optical disk, and recording/reading the signal on a recording area gradually changing recording power when performing the OPC, and measuring both the measurement value including the modulation value and/or the β value obtained by a reading instruction for a predetermined recording area determined by a kind of the disk and the measurement value including the modulation value and/or the β value obtained by a reading instruction for another predetermined recording area determined by the kind of the disk, and retries a reading operation when a magnitude relation between two measurement values does not match a correct magnitude relation, which is a magnitude relation when recording the signal.

\* \* \* \* \*